United States Patent
Ma et al.

(10) Patent No.: US 9,885,821 B2
(45) Date of Patent: Feb. 6, 2018

(54) BACKLIGHT MODULE AND ANTI-PEEPING DISPLAY DEVICE

(71) Applicant: BOE TECHNOLOGY GROUP CO., LTD., Beijing (CN)

(72) Inventors: Xinli Ma, Beijing (CN); Ki Man Kim, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/146,246

(22) Filed: May 4, 2016

(65) Prior Publication Data
US 2016/0349438 A1 Dec. 1, 2016

(30) Foreign Application Priority Data

Jun. 1, 2015 (CN) .......................... 2015 1 0294030

(51) Int. Cl.
*F21V 8/00* (2006.01)
(52) U.S. Cl.
CPC ......... *G02B 6/0036* (2013.01); *G02B 6/0058* (2013.01)
(58) Field of Classification Search
USPC .................... 362/611, 606; 345/156; 349/106
See application file for complete search history.

(56) References Cited

U.S. PATENT DOCUMENTS

| 5,555,329 | A | | 9/1996 | Kuper et al. | |
|---|---|---|---|---|---|
| 6,025,899 | A | * | 2/2000 | Fukunaga | G02F 1/133514 349/106 |
| 2001/0016513 | A1 | * | 8/2001 | Muir | G07F 17/34 463/16 |
| 2006/0214176 | A1 | * | 9/2006 | Ouchi | B82Y 20/00 257/98 |
| 2009/0153783 | A1 | * | 6/2009 | Umemoto | G02B 27/28 349/96 |

(Continued)

FOREIGN PATENT DOCUMENTS

| CN | 1169182 A | 12/1997 |
|---|---|---|
| CN | 202008540 U | 10/2011 |

(Continued)

OTHER PUBLICATIONS

Chinese Office Action in Chinese Application No. 201510294030.2, dated Jul. 10, 2017 with English translation.

*Primary Examiner* — Allyson Trail
(74) *Attorney, Agent, or Firm* — Collard & Roe, P.C.

(57) ABSTRACT

A backlight module and an anti-peeping display device are provided. The backlight module comprises a light guide plate, a lens and a light source. The lens is provided between the light source and the light guide plate, and light emitted from the light source is incident upon the light guide plate through the lens at a same incident angle; a light emission surface of the light guide plate is provided with protrusions, the light emission surface of the light guide plate is a total reflection surface except the regions where the protrusions are provided; a light emission surface of the protrusion is parallel with that of the light guide plate, a surface for performing a first reflection on light incident upon the protrusion is a total reflection surface, and the light incident upon the protrusion exit perpendicularly to the light emission surface of the protrusion after being totally reflected once.

20 Claims, 4 Drawing Sheets

(56) References Cited

U.S. PATENT DOCUMENTS

| | | | |
|---|---|---|---|
| 2011/0304528 A1* | 12/2011 | Murata | G02F 1/134363 345/102 |
| 2012/0257137 A1* | 10/2012 | Nitanai | G02B 6/0021 349/58 |
| 2014/0268868 A1* | 9/2014 | Hatta | G02F 1/133606 362/606 |
| 2015/0316693 A1* | 11/2015 | Sherman | G02B 5/128 362/611 |
| 2016/0011411 A1* | 1/2016 | Wang | G02B 17/006 345/156 |

FOREIGN PATENT DOCUMENTS

| | | |
|---|---|---|
| CN | 102374493 A | 3/2012 |
| CN | 202266945 U | 6/2012 |

\* cited by examiner

BACKLIGHT MODULE AND ANTI-PEEPING DISPLAY DEVICE

CROSS REFERENCE TO RELATED APPLICATIONS

Applicant claims priority under 35 U.S.C. § 119 of Chinese Application No. 201510294030.2 filed on Jun. 1, 2015, the disclosure of which is incorporated by reference.

TECHNICAL FIELD

Embodiments of the present disclosure relate to a backlight module and an anti-peeping display device.

BACKGROUND

At present, in the case that a user conducts business activities or looks up confidential information through an electronic display device, security of the information displayed by the electronic display device needs to be guaranteed. In order to prevent other people from peeping information displayed on the electronic display device, an anti-peeping film for example is provided on the display device. The anti-peeping film is provided with a light shielding bar, such that a visual angle range of the display device is reduced, and the user only can see the displayed content within an allowable range of the visual angle. However, the light shielding bar on the anti-peeping film reduces brightness of a liquid crystal display panel, thereby reducing a display effect of the anti-peeping display device.

SUMMARY

According to embodiments of the disclosure, a backlight module is provided. The backlight module comprises a light guide plate, a lens and a light source. The lens is provided between the light source and the light guide plate, and light emitted from the light source is incident upon the light guide plate through the lens at a same incident angle; a light emission surface of the light guide plate is provided with a plurality of protrusions, the light emission surface of the light guide plate is a total reflection surface except the regions where the protrusions are provided; and a light emission surface of the protrusion is parallel with that of the light guide plate, a surface for performing a first reflection on light incident upon the protrusion is a total reflection surface, and the light incident upon the protrusion exit perpendicularly to the light emission surface of the protrusion after being totally reflected once.

For example, a condition for the light emission surface of the light guide plate to be the total reflection surface except the regions where the protrusions are provided is as follows:

$$\sin\alpha < \frac{1}{n};$$

a condition for the surface for performing the first reflection on the light incident upon the protrusion to be the total reflection surface is as follows:

$$\sin(\beta - \alpha) < \frac{1}{n};$$

a condition for the light incident upon the protrusions to exit perpendicularly to the light emission surface of the protrusion after being totally reflected once is as follows: $2\beta - \alpha = 90°$; where, n is a refractivity of the light guide plate, $\alpha$ is an included angle between an incident light ray refracted on a light incident surface of the light guide plate and the light emission surface of the light guide plate, and $\beta$ is an included angle between the surface for performing the first reflection on the light incident upon the protrusion and the light emission surface of the protrusion.

For example, an end of the light guide plate adjacent to the light source is provided with a light incident structure, a light emission surface of the light incident structure is attached to the light incident surface of the light guide plate; and a cross section of the light incident structure is a right triangle, and the light emission surface of the light incident structure is a surface where one of right-angle edges of the right triangle is provided.

For example, the light emission surface of the light incident structure is perpendicular to a light incident surface of the light incident structure; the light emitted from the light source is perpendicularly incident upon the light incident surface of the light incident structure through the lens; and $\alpha = |90 - 2\gamma|$, in order to meet $$\sin\alpha < \frac{1}{n},$$

where $\gamma$ is a base angle of the light incident structure.

For example, a refractivity of the light guide plate is 1.5; $0 < \alpha < 48.2°$; and $20.9° < \gamma < 69.1°$.

For example, in a case of $20.9° < \gamma < 45°$, a light reflection surface of the light incident structure is provided with a reflection coating.

For example, the light emitted from the light source is incident upon a light incident surface of the light incident structure through the lens in a direction parallel with the light emission surface of the light guide plate;

$$\theta + \alpha + \arcsin\frac{\sin(90 - \theta)}{n} = 90°,$$

in order to meet $$\sin\alpha < \frac{1}{n},$$

where $\theta$ is an included angle between the light incident surface of the light incident structure and the light emission surface of the light guide plate.

For example, the protrusions are inverted trapezoidal protrusions.

For example, the protrusions gradually increase in density in a direction from one side close to the light source to one side far away from the light source.

For example, a surface of the light guide plate opposite to the light emission surface is provided with a pit recessed towards the light emission surface of the light guide plate, and the pit is corresponding to a display region of a liquid crystal display panel.

For example, the surface for performing the first reflection on the light incident upon the protrusion is a surface of the protrusion far away from the light source.

For example, $$x \geq \frac{y}{tg\alpha}$$

and $$z \leq \frac{y}{tg\alpha} - \frac{y}{tg\beta},$$

in order to enable the light incident upon the protrusion to be all incident upon the surface for totally reflecting the light in the protrusion, where x is a width of the light emission surface of the protrusion, y is a distance between the light emission surface of the protrusion and a light incident surface of the protrusion, z is a width of a connection part of the light incident surface of the protrusion and the light emission surface of the light guide plate, α is an included angle between an incident light ray refracted on a light incident surface of the light guide plate and the light emission surface of the light guide plate, and β is an included angle between the surface for performing the first reflection on the light incident upon the protrusion and the light emission surface of the protrusion.

According to the embodiments of the disclosure, an anti-peeping display device is provided. The anti-peeping display device comprises the backlight module as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
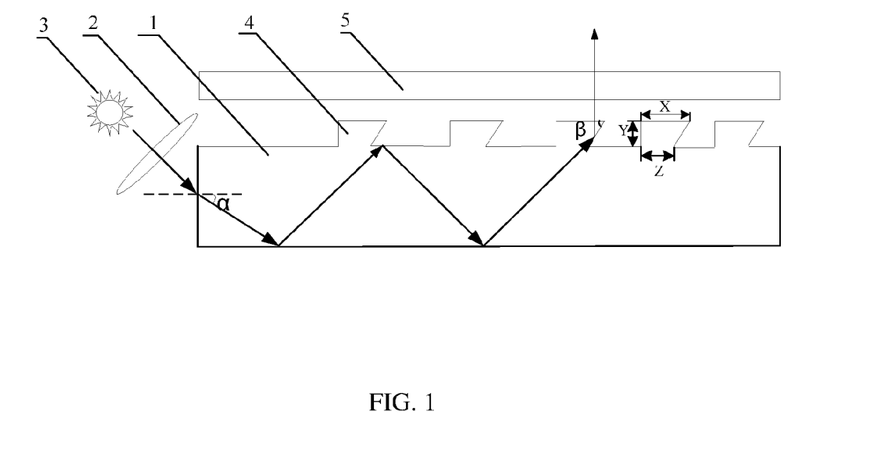
FIG. 1 is a cross-sectional schematic view I of a backlight module according to embodiments of the present disclosure.

Embodiments of the present disclosure provide a backlight module. As shown in FIG. 1, the backlight module comprising a light guide plate 1, a lens 2 and a light source 3; the lens 2 is provided between the light source 3 and the light guide plate 1, and light emitted from the light source 3 is incident upon the light guide plate 1 through the lens 2 at a same incident angle; a light emission surface of the light guide plate 1 is provided with a plurality of protrusions 4, and the light emission surface of the light guide plate 1 is a total reflection surface except regions where the protrusions 4 are provided. A light emission surface of the protrusion 4 is parallel with that of the light guide plate 1, a surface of the protrusion 4 for performing a first reflection on light incident upon the protrusion 4 is a total reflection surface, and after being totally reflected once, the light incident upon the protrusion 4 exit perpendicularly to the light emission surface of the protrusion 4.

Figure 2:
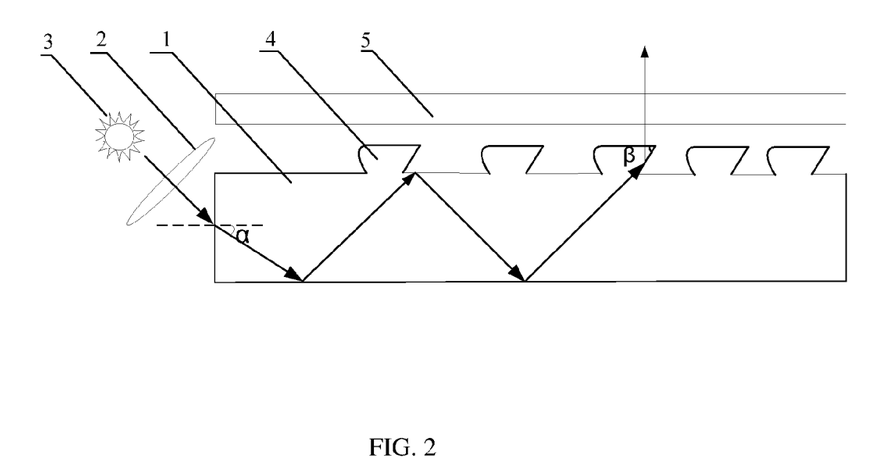
FIG. 2 is a cross-sectional schematic view II of the backlight module according to the embodiments of the present disclosure.

Exemplarily, as shown in FIG. 1, the light source 3 is provided on upper left of the light guide plate 1, the light emitted from the light source is incident upon the light guide plate 1 in parallel after being refracted via the lens 2, and the lens 2 is any lens of enabling the light emitted from the light source 3 to be changed into parallel light, for example, a collimating lens. As shown in FIG. 1, a light incident surface of the light guide plate 1 is a left end surface of the light guide plate 1, and the light emission surface of the light guide plate 1 is an upper surface of the light guide plate 1. The protrusions 4 are provided on the upper surface of the light guide plate 1. The protrusion 4 for example has a cross section of trapezoidal shape or approximately trapezoidal shape. For example, the protrusion 4 has the cross section of an inverted trapezoidal shape in FIG. 1; for example, a plane where a waist for reflecting the light in the inverted trapezoidal shape is provided is a total reflection surface, and a plane where a waist not reflecting the light is provided is perpendicular to the light emission surface of the light guide plate 1. For another example, the protrusion has the cross section of an approximately inverted trapezoidal shape in FIG. 2, a plane where a waist for reflecting the light in the approximately inverted trapezoidal shape is provided is a total reflection surface, and a plane where a waist not reflecting the light is provided is a curved surface. The protrusion 4 for example has a shape of strip, and in the case that the protrusion 4 being in the shape of the strip, the protrusions 4 are provided on the upper surface of the light guide plate 1 at intervals. The protrusions 4 for example are blocks, and in the case that the protrusions 4 being blocks, the protrusions are provided on the upper surface of the light guide plate 1 at intervals.

For example, the surface for performing the first reflection on the light incident upon the protrusion 4 is the surface of the protrusion far away from the light source. As shown in FIG. 1, the plane where the waist for reflecting the light in the trapezoidal shape is provided is a surface far away from the light source.

In the embodiments of the present disclosure, the light emitted from the light source 3 are changed into parallel light through the lens 2, the parallel light is incident upon the light guide plate 1, is further incident upon the protrusions 4 after being refracted by the light guide plate 1, and exits perpendicularly to the light emission surfaces of the protrusions 4 after being totally reflected once in the protrusions, so that the light incident upon the light guide plate 1 all exits from the light emission surfaces of the protrusions 4 perpendicularly after being reflected by the light guide plate 1. In this way, the light exiting from the protrusions 4 is perpendicularly incident upon a liquid crystal display panel 5, and then, perpendicularly exits from a front side of the liquid crystal display panel 5, which decreases a visual angle range of the liquid crystal display panel 5, thereby achieving an anti-peeping effect. The backlight module according to the embodiments of the present disclosure has the anti-peeping effect without installing an anti-peeping film, a problem that the anti-peeping film reduces brightness of the liquid crystal display panel 5 cannot occur, and therefore, a display effect of an anti-peeping display device is improved without influencing the anti-peeping effect of the anti-peeping display device.

It should be noted that, taking the backlight module shown in FIG. 1 as an example, after being totally reflected on the light emission surface of the light guide plate 1 and the waists for reflecting the light in the protrusions 4, the light is perpendicularly incident toward the liquid crystal display panel 5; in order to ensure that an emission direction of light exiting from the protrusions 4 is perpendicular to the liquid crystal display panel 5, a scatter plate or a prism film does not need to be provided between the liquid crystal display panel 5 and the light guide plate 1, so that a manufacturing process is simplified and cost is reduced on the premise that a display effect is not influenced.

In order to enable the light incident upon the protrusions 4 to all perpendicularly exit from the light emission surfaces of the protrusions 4 after being totally reflected once, the light incident upon the protrusions 4 firstly need to be all incident upon the surfaces for totally reflecting the light in the protrusions 4, and then, exit from the light emission surfaces of the protrusions 4 after being totally reflected. Taking a cross-sectional schematic view of the backlight module in FIG. 1 as an example, a width of the light emission surface of the protrusion 4 is x, and a distance between the light emission surface of the protrusion 4 and the light incident surface of the protrusion 4 is y, a width of a connection part of the light incident surface of the protrusion 4 and the light emission surface of the light guide plate 1 is z, and x, y and z need to meet the following relational expressions:

$$x \geq \frac{y}{tg\alpha} \text{ and } z \leq \frac{y}{tg\alpha} - \frac{y}{tg\beta}.$$

In the case that x, y and z meet the above-described relational expressions, the light incident upon the protrusions 4 are all incident upon the surfaces for totally reflecting the light in the protrusions 4, thereby avoiding a situation that the light cannot perpendicularly exit from the light emission surfaces of the protrusions 4 due to the fact that the light incident upon the protrusions 4 are directly incident upon the light emission surfaces of the protrusions 4.

In order to enable the light emission surface of the light guide plate 1 to be the total reflection surface except the regions where the protrusions 4 are provided, a condition of total reflection needs to be met in the case that the light are incident upon other regions of the light emission surface of the light guide plate 1 than the regions where the protrusions 4 are provided. An included angle between an incident light ray refracted on the light incident surface of the light guide plate 1 and the light emission surface of the light guide plate 1 is α, then an incident angle is 90−α in the case that the light are incident upon the region of the light emission surface of the light guide plate 1 except the regions where the protrusions 4 are provided; a default refractivity of air is 1, according to Snell's law, a condition for the light to be totally reflected in the region of the light emission surface of the light guide plate 1 except the regions where the protrusions 4 are provided is as follows:

$$\sin(90-\alpha) \geq \frac{1}{n}, \text{ i.e., } \sin\alpha < \frac{1}{n},$$

where n is a refractivity of the light guide plate 1. In the case that the included angle α meets the above-described condition, the light are totally reflected in the region of the light emission surface of the light guide plate 1 except the regions where the protrusions 4 are provided, which avoids that the light are refracted out of the light guide plate 1 from the region of the light emission surface of the light guide plate 1 except the regions where the protrusions 4 are provided, so as to enable the light emission surface of the light guide plate 1 to be the total reflection surface except the regions where the protrusions 4 are provided.

As shown in FIG. 1, in order for the light incident upon the protrusions 4 to exit perpendicularly to the light emission surfaces of the protrusions 4 after being totally reflected once, an included angle between the surface for performing the first reflection on the light incident upon the protrusion 4 and the light emission surface of the protrusion 4 is β, and the included angle α and the included angle β meet 2β−α=90°. Thus, as the included angle between the incident light ray refracted on the light incident surface of the light guide plate 1 and the light emission surface of the light guide plate 1 is α, an included angle between the light ray incident upon the protrusion 4 and the light incident surface of the protrusion 4 is also α, an incident angle is 90−β+α in the case that the light is incident upon the surface for performing the first reflection in the protrusion 4; an included angle between the light that have been totally reflected and the surface for totally reflecting the light is β−α, and 2β−α=90°, so the light exit perpendicularly to the light emission surface of the protrusion 4.

In order to enable the surface for performing the first reflection on the light incident upon the protrusion 4 to be the total reflection surface, the incident angle is 90−β+α in the case that the light is incident upon the surface for performing the first reflection in the protrusion 4, the default refractivity of air is 1, according to Snell's law, $$\sin(90-\beta+\alpha) \geq \frac{1}{n}, \text{ i.e., } \sin(\beta-\alpha) < \frac{1}{n},$$

where n is the refractivity of the light guide plate 1. In the case that the included angle α and the included angle β meet the above-described condition, the light is totally reflected on the surface for performing the first reflection in the protrusion 4, which avoids that the light is refracted out of the protrusion 4 from the surface for performing the first reflection in the protrusion 4.

From the above, in the case that the included angle α and the included angle β meet the following relational expressions: 2β−α=90°, $$\sin(\beta-\alpha) < \frac{1}{n} \text{ and } \sin\alpha < \frac{1}{n},$$

the light emission surface of the light guide plate 1 is the total reflection surface except the regions where the protrusions 4 are provided, the surfaces for performing the first reflection on the light incident upon the protrusions 4 are the total reflection surfaces, and the light incident upon the protrusions 4 exit perpendicularly to the light emission surfaces of the protrusions 4 after being totally reflected once.

In order for the light to enter the light guide plate 1, for example, an end of the light guide plate 1 adjacent to the light source 3 is provided with a light incident structure 6, and a light emission surface of the light incident structure 6 is attached to the light incident surface of the light guide plate 1; a cross section of the light incident structure 6 is a right triangle, and the light emission surface of the light incident structure 6 is a surface where one of right-angle edges of the right triangle is provided. The light incident structure 6 for example is shown in FIG. 3, FIG. 4 or FIG. 5.

Figure 3:
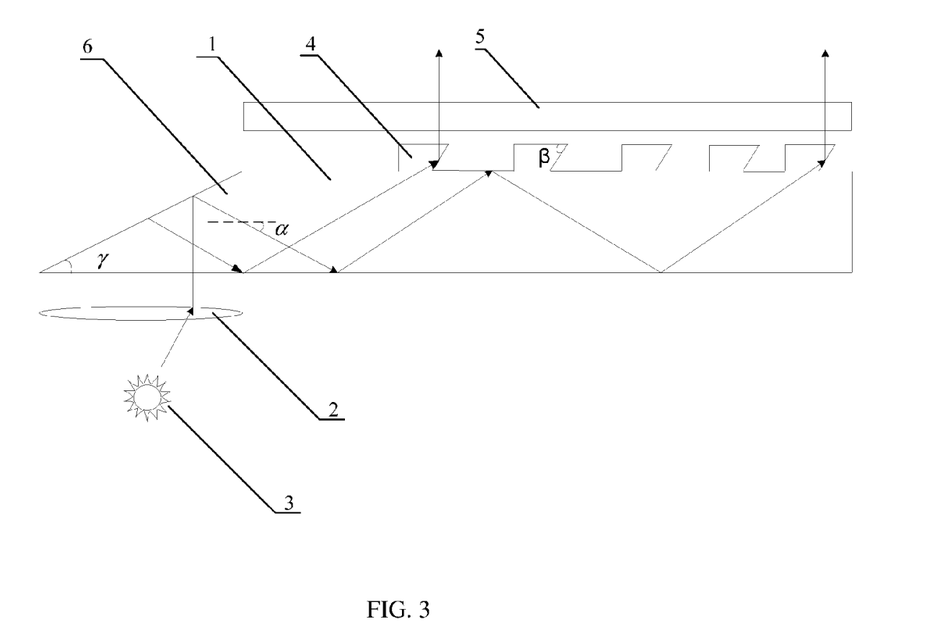
FIG. 3 is a cross-sectional schematic view III of the backlight module according to the embodiments of the present disclosure.

As shown in FIG. 3, the cross section of the light incident structure 6 is the right triangle, the light emission surface of the light incident structure 6 is perpendicular to the light incident surface of the light incident structure 6; the light emitted from the light source 3 is perpendicularly incident upon the light incident surface of the light incident structure 6 through the lens 2, and then is incident upon the light guide plate 1 after being reflected by a light reflection surface of the light incident structure 6. In order to enable the included angle α to meet $$\sin\alpha < \frac{1}{n}$$

in the case that the light is incident upon the light guide plate 1 from the light incident structure 6, a base angle γ of the light incident structure 6 needs to meet the following relational expression: $\alpha=|90-2\gamma|$. In the case that the base angle γ meets the above-described relational expression, the light is totally reflected on the light emission surface of the light guide plate 1 after being incident upon the light guide plate 1 from the light incident structure 6, which avoids that the light are refracted out of the light guide plate 1 from the region of the light emission surface of the light guide plate 1 except the regions where the protrusions 4 are provided.

Figure 4:
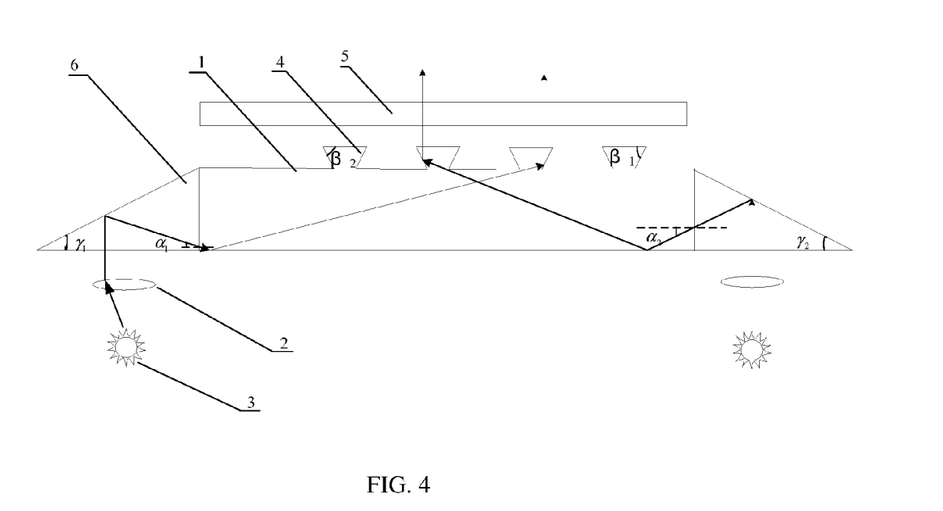
FIG. 4 is a cross-sectional schematic view IV of the backlight module according to the embodiments of the present disclosure.
Figure 5:
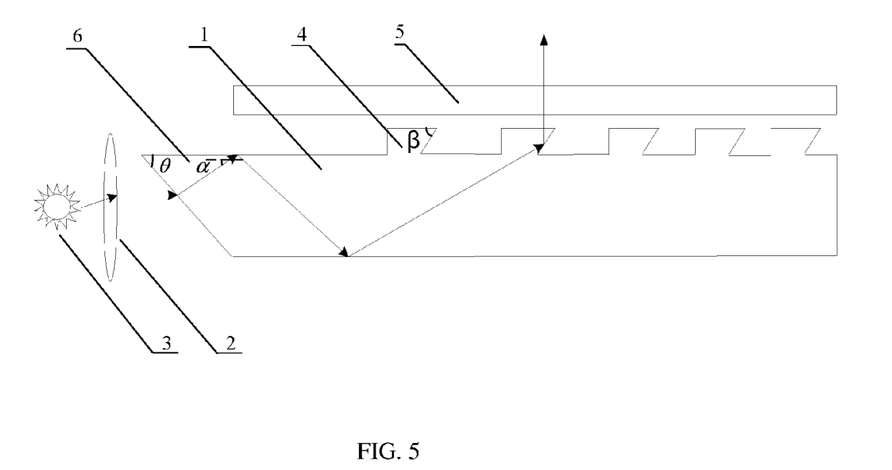
FIG. 5 is a cross-sectional schematic view V of the backlight module according to the embodiments of the present disclosure.

As shown in FIG. 4, the backlight module comprises two light sources 3, the two light sources 3 are respectively provided on two ends of the light guide plate 1, and at the moment, included angles between incident light refracted on two light incident surfaces of two ends of the light guide plate 1 and the light emission surface of the light guide plate 1 are $\alpha_1$ and $\alpha_2$ respectively; light incident structures 6 are provided on two ends of the light guide plate 1, the cross section of the light incident structure 6 is the right triangle, and the light emission surface of the light incident structure 6 is perpendicular to light incident surface of the light incident structure 6; the light emitted from the light source 3 is perpendicularly incident upon the light incident surface of the corresponding light incident structure 6 through then corresponding lens 2, and then is incident upon the light guide plate 1 after being reflected by the light reflection surface of the light incident structure 6. In order to enable included angle $\alpha_1$ to meet $$\sin\alpha_1 < \frac{1}{n}$$

in the case that the light is incident upon the light guide plate 1 from the light incident structure 6, a base angle $\gamma_1$ of the light incident structure 6 needs to meet the following relational expression: $\alpha_1=|90-2\gamma_1|$; in order to enable the included angle $\alpha_2$ to meet $$\sin\alpha_2 < \frac{1}{n}$$

in the case that the light is incident upon the light guide plate 1 from the light incident structure 6, a base angle $\gamma_2$ of the light incident structure 6 needs to meet the following relational expression: $\alpha_2=|90-2\gamma_2|$. In the case that the base angles $\gamma_1$ and $\gamma_2$ meet the above-described relational expressions, the light is totally reflected on the light emission surface of the light guide plate 1 after being incident upon the light guide plate 1 from the light incident structures 6, which avoids that the light is refracted out of the light guide plate 1 from the region of the light emission surface of the light guide plate 1 except the regions where the protrusions 4 are provided.

For example, as shown in FIG. 3, the refractivity of the light guide plate is 1.5; in order that the light incident upon the light guide plate 1 is totally reflected on the light emission surface of the light guide plate 1, the angle α is within a range of 0<α<48.2°, and the angle γ is within a range of 20.9°<γ<69.1°. In order to increase brightness of light emitted from the light emission surfaces of protrusions 4, the light is only reflected but not refracted on the light reflection surface of the light incident structure 6, so that the light is all reflected to enter the light guide plate 1, thereby ensuring the brightness of the light emitted from the light emission surfaces of the protrusions 4, i.e., in the case that 20.9°<γ≤45°, the light reflection surface of the light incident surface 6 is provided with a reflection coating 7; in the case that 45°≤γ<69.1°, the light is totally reflected on the light reflection surface of the light incident structure 6. Thus, after being incident upon the light reflection surface of the light incident structure 6, the light is all reflected to enter the light guide plate 1 without loss due to refraction, the brightness of the light emitted from the light emission surfaces of the protrusions 4 is ensured. Similarly, in the structure as shown in FIG. 4, in the case that $\gamma_1$ and $\gamma_2$ respectively meet the above-described conditions, an effect that the brightness of the light emitted from the light emission surfaces of the protrusions 4 is ensured is achieved as well.

As shown in FIG. 5, the light emitted from the light source 3 is incident upon the light incident surface of the light incident structure 6 through the lens 2 in a direction parallel with the light emission surface of the light guide plate 1; an included angle between the light incident surface of the light incident structure 6 and the light emission surface of the light guide plate 1 is θ, and the included angle θ meets the following relational expression:

$$\theta + \alpha + \arcsin\frac{\sin(90-\theta)}{n} = 90°,$$

wherein, the default refractivity of air is 1, and n is a refractivity of the light guide plate 1, thereby realizing $$\sin\alpha < \frac{1}{n}$$

in the case that the light areis incident upon the light guide plate 1 from the light incident structure 6.

For example, in order to enable the brightness of the light emitted from the light emission surfaces of the protrusions 4 to be uniform, the protrusions 4 gradually increase in density in a direction from one side close to the light source 3 to one side far away from the light source 3. As intensity of light far away from the light source 3 is smaller than that of light close to the light source 3, the density of protrusions 4 far away from the light source 3 is greater than that of protrusions close to the light source 3, so that light exiting far away from the light source 3 are increased, thus enabling the brightness of the light emitted from the light emission surface of the light guide plate 1 to be uniform.

Figure 6:
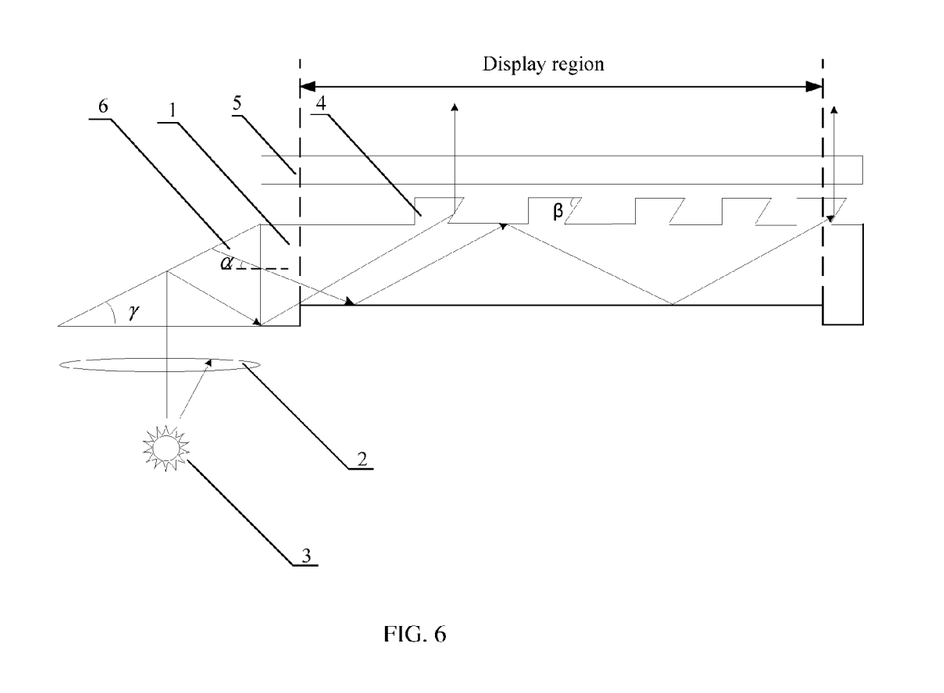
FIG. 6 is a cross-sectional schematic view VI of the backlight module according to the embodiments of the present disclosure.

For example, in order to increase the brightness of the light emitted from the light emission surfaces of the protrusions 4, as shown in FIG. 6, a surface opposite to the light emission surface of the light guide plate 1 is provided with a pit recessed towards the light emission surface of the light guide plate 1, and the pit is at least corresponding to a display region of a liquid crystal display panel 5. Thus, a transmission distance of the light in the light guide plate 1 is reduced, thereby reducing loss of the intensity of the light, and increasing the brightness of the light emitted from the light emission surfaces of the protrusions 4.

Figure 7:
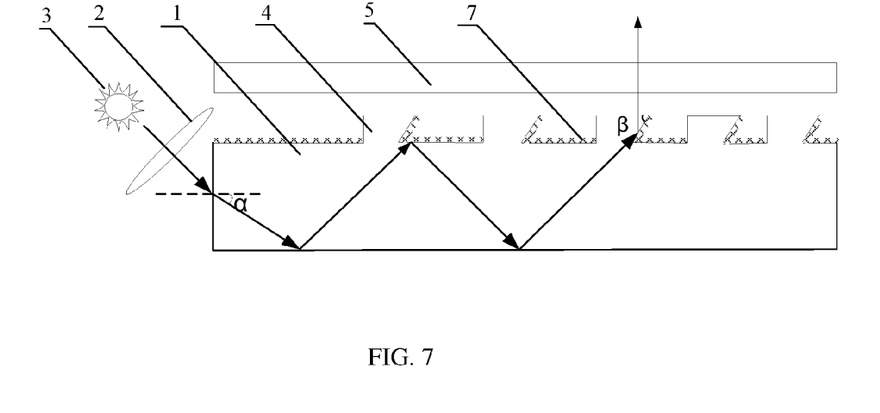
FIG. 7 is a cross-sectional schematic view VII of the backlight module according to the embodiments of the present disclosure.

It should be noted that, in the backlight module according to the embodiments of the disclosure, in order to avoid that light is refracted on the region of the light emission surface of the light guide plate 1 except the regions where protrusions are provided, and in order to avoid that the light exiting from the backlight module is not perpendicularly incident upon the liquid crystal display panel 5 due to the fact that the light is refracted on the surfaces for performing the first reflection on the light in the protrusions 4, it is required that the light is only reflected on the region of the light emission surface of the light guide plate 1 except the regions where the protrusions 4 are provided and the light is only reflected on the surfaces for performing first reflection on the light in the protrusions 4, i.e., it is required that the above-described two reflections are both total reflection. There are multiple methods for realizing that the light is only reflected but not refracted on a surface, for example, the region of the light emission surface of the light guide plate 1 except the regions where the protrusions 4 are provided and the surfaces for performing the first reflection on the light in the protrusions 4 are provided with a reflection coating, as shown in FIG. 7, so that an effect that the light is only reflected but not refracted is also be achieved. Therefore, the embodiments of the present disclosure do not limit the methods for realizing that the light is only reflected but not refracted.

The embodiments of the present disclosure further provide an anti-peeping display device, and the anti-peeping display device comprises the backlight module according to the embodiments of the disclosure. As the anti-peeping display device comprises the backlight module according to the embodiments of the disclosure, light exiting from the backlight module is perpendicularly incident upon a liquid crystal display panel, and then perpendicularly exits from a front side of the liquid crystal display panel, which reduces a visual angle range of the liquid crystal display panel, thereby being easily to achieve an anti-peeping design of the anti-peeping display device. The anti-peeping display device has an anti-peeping effect without installing an anti-peeping film, and thus, a problem that the anti-peeping film reduces the brightness of the liquid crystal display panel cannot occur, and therefore, a display effect of the anti-peeping display device is improved without influencing the anti-peeping effect of the anti-peeping display device.

The anti-peeping display device for example is any product or component with a display function, such as a liquid crystal display panel, an electronic paper, a mobile phone, a tablet computer, a television, a display, a notebook computer, a digital photo frame or a navigator.

In the description of the above embodiments, the features, structures, materials, or characteristics may be combined in any suitable manner.

The foregoing embodiments merely are exemplary embodiments of the disclosure, and not intended to define the scope of the disclosure, and the scope of the disclosure is determined by the appended claims.

The present application claims priority of Chinese Patent Application No. 201510294030.2 filed on Jun. 1, 2015, the present disclosure of which is incorporated herein by reference in its entirety as part of the present application.

The invention claimed is:

1. A backlight module, comprising a light guide plate, a lens and a light source; wherein,
   the lens is provided between the light source and the light guide plate, and light emitted from the light source is incident upon the light guide plate through the lens at a same incident angle;
   a light emission surface of the light guide plate is provided with a plurality of protrusions, the light emission surface of the light guide plate is a total reflection surface except the regions where the protrusions are provided; and
   a light emission surface of the protrusion is parallel with that of the light guide plate, a surface for performing a first reflection on light incident upon the protrusion is a total reflection surface, and the light incident upon the protrusion exit perpendicularly to the light emission surface of the protrusion after being totally reflected once.

2. The backlight module according to claim 1, wherein,
   a condition for the light emission surface of the light guide plate to be the total reflection surface except the regions where the protrusions are provided is as follows:

$$\sin\alpha < \frac{1}{n};$$

a condition for the surface for performing the first reflection on the light incident upon the protrusion to be the total reflection surface is as follows:

$$\sin(\beta - \alpha) < \frac{1}{n};$$

a condition for the light incident upon the protrusions to exit perpendicularly to the light emission surface of the protrusion after being totally reflected once is as follows:
2β−α=90°;
where, n is a refractivity of the light guide plate, α is an included angle between an incident light ray refracted on a light incident surface of the light guide plate and the light emission surface of the light guide plate, and β is an included angle between the surface for performing the first reflection on the light incident upon the protrusion and the light emission surface of the protrusion.

3. The backlight module according to claim 2, wherein,
an end of the light guide plate adjacent to the light source is provided with a light incident structure, a light emission surface of the light incident structure is attached to the light incident surface of the light guide plate; and
a cross section of the light incident structure is a right triangle, and the light emission surface of the light incident structure is a surface where one of right-angle edges of the right triangle is provided.

4. The backlight module according to claim 3, wherein, the light emission surface of the light incident structure is perpendicular to a light incident surface of the light incident structure;
the light emitted from the light source is perpendicularly incident upon the light incident surface of the light incident structure through the lens; and
$\alpha=|90-2\gamma|$, in order to meet $$\sin\alpha < \frac{1}{n},$$

where $\gamma$ is a base angle of the light incident structure.

5. The backlight module according to claim 4, wherein, a refractivity of the light guide plate is 1.5;
$0<\alpha<48.2°$; and
$20.9°<\gamma<69.1°$.

6. The backlight module according to claim 5, wherein, in a case of $20.9°<\gamma<45°$, a light reflection surface of the light incident structure is provided with a reflection coating.

7. The backlight module according to claim 3, wherein, the light emitted from the light source is incident upon a light incident surface of the light incident structure through the lens in a direction parallel with the light emission surface of the light guide plate;

$$0 + \alpha + \arcsin\frac{\sin(90-\theta)}{n} = 90°,$$

in order to meet $$\sin\alpha < \frac{1}{n},$$

where $\theta$ is an included angle between the light incident surface of the light incident structure and the light emission surface of the light guide plate.

8. The backlight module according to claim 1, wherein, the protrusions are inverted trapezoidal protrusions.

9. The backlight module according to claim 1, wherein, the protrusions gradually increase in density in a direction from one side close to the light source to one side far away from the light source.

10. The backlight module according to claim 1, wherein, a surface of the light guide plate opposite to the light emission surface is provided with a pit recessed towards the light emission surface of the light guide plate, and the pit is corresponding to a display region of a liquid crystal display panel.

11. The backlight module according to claim 1, wherein the surface for performing the first reflection on the light incident upon the protrusion is a surface of the protrusion far away from the light source.

12. The backlight module according to claim 1, wherein $$x \geq \frac{y}{tg\alpha} \text{ and } z \leq \frac{y}{tg\alpha} - \frac{y}{tg\beta},$$

in order to enable the light incident upon the protrusion to be all incident upon the surface for totally reflecting the light in the protrusion, where x is a width of the light emission surface of the protrusion, y is a distance between the light emission surface of the protrusion and a light incident surface of the protrusion, z is a width of a connection part of the light incident surface of the protrusion and the light emission surface of the light guide plate, $\alpha$ is an included angle between an incident light ray refracted on a light incident surface of the light guide plate and the light emission surface of the light guide plate, and $\beta$ is an included angle between the surface for performing the first reflection on the light incident upon the protrusion and the light emission surface of the protrusion.

13. An anti-peeping display device, comprising the backlight module according to claim 1.

14. A backlight module, comprising a light guide plate, a lens and a light source; wherein,
the lens is provided between the light source and the light guide plate, and light emitted from the light source is incident upon the light guide plate through the lens at a same incident angle;
a light emission surface of the light guide plate is provided with a plurality of protrusions, the light emission surface of the light guide plate is a total reflection surface except the regions where the protrusions are provided;
a light emission surface of the protrusion is parallel with that of the light guide plate, a surface for performing a first reflection on light incident upon the protrusion is a total reflection surface, and the light incident upon the protrusion exit perpendicularly to the light emission surface of the protrusion after being totally reflected once; and
a condition for the light emission surface of the light guide plate to be the total reflection surface except the regions where the protrusions are provided is as follows:

$$\sin\alpha < \frac{1}{n};$$

a condition for the surface for performing the first reflection on the light incident upon the protrusion to be the total reflection surface is as follows:

$$\sin(\beta - \alpha) < \frac{1}{n};$$

a condition for the light incident upon the protrusions to exit perpendicularly to the light emission surface of the protrusion after being totally reflected once is as follows:
$2\beta - \alpha = 90°$;
where, n is a refractivity of the light guide plate, $\alpha$ is an included angle between an incident light ray refracted on a light incident surface of the light guide plate and the light emission surface of the light guide plate, and β is an included angle between the surface for performing the first reflection on the light incident upon the protrusion and the light emission surface of the protrusion.

15. The backlight module according to claim 14, wherein, an end of the light guide plate adjacent to the light source is provided with a light incident structure, a light emission surface of the light incident structure is attached to the light incident surface of the light guide plate; and a cross section of the light incident structure is a right triangle, and the light emission surface of the light incident structure is a surface where one of right-angle edges of the right triangle is provided.

16. The backlight module according to claim 15, wherein, the light emission surface of the light incident structure is perpendicular to a light incident surface of the light incident structure;

the light emitted from the light source is perpendicularly incident upon the light incident surface of the light incident structure through the lens; and α=|90−2γ|, in order to meet $$\sin\alpha < \frac{1}{n},$$

where γ is a base angle of the light incident structure.

17. The backlight module according to claim 16, wherein, a refractivity of the light guide plate is 1.5;

0<α<48.2°; and 20.9°<γ<69.1°.

18. The backlight module according to claim 17, wherein, in a case of 20.9°<γ<45°, a light reflection surface of the light incident structure is provided with a reflection coating.

19. The backlight module according to claim 15, wherein, the light emitted from the light source is incident upon a light incident surface of the light incident structure through the lens in a direction parallel with the light emission surface of the light guide plate;

$$\theta + \alpha + \arcsin\frac{\sin(90-\theta)}{n} = 90°,$$

in order to meet $$\sin\alpha < \frac{1}{n},$$

where θ is an included angle between the light incident surface of the light incident structure and the light emission surface of the light guide plate.

20. A backlight module, comprising a light guide plate, a lens and a light source; wherein, the lens is provided between the light source and the light guide plate, and light emitted from the light source is incident upon the light guide plate through the lens at a same incident angle;

a light emission surface of the light guide plate is provided with a plurality of protrusions, the light emission surface of the light guide plate is a total reflection surface except the regions where the protrusions are provided;

a light emission surface of the protrusion is parallel with that of the light guide plate, a surface for performing a first reflection on light incident upon the protrusion is a total reflection surface, and the light incident upon the protrusion exit perpendicularly to the light emission surface of the protrusion after being totally reflected once; and $$x \geq \frac{y}{tg\alpha} \text{ and } z \leq \frac{y}{tg\alpha} - \frac{y}{tg\beta},$$

in order to enable the light incident upon the protrusion to be all incident upon the surface for totally reflecting the light in the protrusion, where x is a width of the light emission surface of the protrusion, y is a distance between the light emission surface of the protrusion and a light incident surface of the protrusion, z is a width of a connection part of the light incident surface of the protrusion and the light emission surface of the light guide plate, α is an included angle between an incident light ray refracted on a light incident surface of the light guide plate and the light emission surface of the light guide plate, and β is an included angle between the surface for performing the first reflection on the light incident upon the protrusion and the light emission surface of the protrusion.

* * * * *